(12) United States Patent
McLean et al.

(10) Patent No.: US 7,458,997 B2
(45) Date of Patent: *Dec. 2, 2008

(54) METHOD FOR MAKING COMPACT CHEMICAL REACTORS

(75) Inventors: Gerard Francis McLean, West Vancouver (CA); Duhane Lam, Vancouver (CA); Olen Vanderleeden, Coquitlam (CA)

(73) Assignee: Angstrom Power Incorporated, North Vancouver (CA)

( * ) Notice: Subject to any disclaimer, the term of this patent is extended or adjusted under 35 U.S.C. 154(b) by 1059 days.

This patent is subject to a terminal disclaimer.

(21) Appl. No.: 10/818,826

(22) Filed: Apr. 6, 2004

(65) Prior Publication Data

US 2005/0226996 A1 Oct. 13, 2005

(51) Int. Cl.
*H01M 4/82* (2006.01)
*H01M 6/00* (2006.01)
*H01M 2/14* (2006.01)

(52) U.S. Cl. .................. 29/623.5; 26/623.1; 429/38
(58) Field of Classification Search ............. 29/623.5, 29/623.1
See application file for complete search history.

(56) References Cited

U.S. PATENT DOCUMENTS

| | | | |
|---|---|---|---|
| 3,634,140 A | 1/1972 | Von Krusenstierna | 136/86 B |
| 5,252,410 A | 10/1993 | Wilkinson | 429/33 |
| 5,364,711 A | 11/1994 | Yamada | 429/15 |
| 5,480,738 A | 1/1996 | Elangovan | 429/32 |
| 5,508,128 A | 4/1996 | Akagi | 429/30 |
| 5,631,099 A | 5/1997 | Hockaday | 429/30 |
| 5,672,439 A | 9/1997 | Wilkinson | 429/40 |
| 5,759,712 A | 6/1998 | Hockaday | 429/30 |
| 5,861,221 A | 1/1999 | Ledjeff | 429/32 |
| 5,925,477 A | 7/1999 | Ledjeff | 429/32 |
| 5,989,741 A | 11/1999 | Bloomfield | 429/32 |
| 6,060,188 A | 5/2000 | Muthuswamy | 429/31 |

(Continued)

FOREIGN PATENT DOCUMENTS

CA 2 273 316 11/1999

(Continued)

OTHER PUBLICATIONS

Wainwright, et al. "A Microfabricated Hydrogen/Air Fuel Cell" 195 Meeting of the Electrochemical Society, Seattle, WA ,1999.

*Primary Examiner*—Patrick Ryan
*Assistant Examiner*—Julian Mercado
(74) *Attorney, Agent, or Firm*—Schwegman, Lundberg & Woessner, P.A.

(57) ABSTRACT

The methods include steps for making a fuel cell layer, making a compact chemical reactor with high aspect ratio cavities from components with low aspect ratio cavities, and forming of a high aspect ratio compact chemical reactor using low aspect ratio layers. The methods entail forming at least two process layers; forming a perimeter barrier on at least one side of one of the process layers creating an intermediate assembly with at least one low aspect ratio cavity; repeating the initial steps to create additional intermediate assemblies with at least one low aspect ratio cavity; joining intermediate assemblies to create a compact chemical reactor with high aspect ratio cavities; and joining the compact chemical reactor with high aspect ratio cavities to two reactant plenums to facilitate a transport process between reactant plenums and process layers.

74 Claims, 6 Drawing Sheets

U.S. PATENT DOCUMENTS

| | | | |
|---|---|---|---|
| 6,127,058 A | 10/2000 | Pratt | 429/30 |
| 6,387,557 B1 | 5/2002 | Krasij | 429/32 |
| 6,620,542 B2 | 9/2003 | Pan | 429/41 |
| 6,740,444 B2 | 5/2004 | Leban | 429/41 |
| 6,830,736 B1 | 12/2004 | Lamla | 422/211 |

FOREIGN PATENT DOCUMENTS

| | | |
|---|---|---|
| CA | 2 396 191 | 9/2001 |
| CA | 2 438 733 | 8/2002 |
| CA | 2 484 294 | 11/2003 |
| EP | 0585049 | 8/1993 |
| EP | 0 823 743 | 7/1997 |
| EP | 0823743 | 8/1997 |
| GB | 2339058 | 1/2000 |
| JP | 8050903 | 2/1996 |
| WO | PCT/US01/11763 | 12/2001 |
| WO | PCT/US02/00063 | 1/2002 |
| WO | PCT/US02/17434 | 6/2002 |

METHOD FOR MAKING COMPACT CHEMICAL REACTORS

FIELD

The present embodiments relates to methods of making compact chemical reactors which can be used as fuel cell layers.

BACKGROUND

Layered, planar chemical reactors can be used for many tasks. One major problem with the layered planar chemical reactor is that the layers must be held in intimate electrical contact with each other. If the intimate contact does not occur, the internal resistance of the stack increases causing the overall efficiency of the chemical reactor to decrease.

A second problem with the layered planar chemical reactors is that larger surface areas increase the difficultly of maintaining consistent contact with the inner recesses of the layered planar chemical reactor.

Since both reactants are required to flow within the plane of the layered planar chemical reactor, at least four and up to six distinct layers have been required to form a workable cell. These layers are usually manufactured into two separate chemical reactors components. A chemical reactor stack is, then, formed by bringing layers into contact with each other. In forming the chemical reactor stack by contacting the layers, reactant flow must be allowed within the layers, but reactants must not be allowed to leak from the assembled chemical reactor stack. The assembled stack usually has to be clamped together with significant force in order to activate perimeter seals and reduce losses associated with transport processes inherent in the reaction.

A need has existed for a method for making a compact chemical reactor using a low cost manufacturing technique. A need has existed for a method of making a micro chemical reactor having the ability to utilize a wide variety of electrolytes.

A need has existed for a method to make a micro chemical reactor, which has the ability to scale to high power. A need has existed for a method of making compact chemical reactors capable of being connected together without the need for external components for connecting the chemical reactors together.

A need has existed for a method of making compact chemical reactor with high aspect ratio cavities. The present invention meets these needs.

SUMMARY

A method for making a high aspect ratio compact chemical reactor with high aspect ratio cavities using components with low aspect ratio cavities beings by creating at least two low aspect ratio process layers and forming at least one low aspect ratio perimeter barrier by forming a barrier material into at least one barrier shape. The method continues by creating low aspect ratio cavities by joining the low aspect ratio perimeter barrier to at least one side of one of the process layers creating an intermediate assembly with at least one low aspect ratio cavity. These steps are repeated to create additional intermediate assemblies with at least one low aspect ratio cavity.

The method continues by creating high aspect ratio cavities by joining one of the process layers to the low aspect ratio cavities. The step of creating high aspect ratio cavities is repeated to create a plurality of joined intermediate assemblies to create a compact chemical reactor with high aspect ratio cavities. The method ends by joining the compact chemical reactor with high aspect ratio cavities to two reactant plenums to facilitate a transport process between the reactant plenums and the process layers.

BRIEF DESCRIPTION OF THE DRAWINGS

In the detailed description of the preferred embodiments presented below, reference is made to the accompanying drawings, in which.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular descriptions and that it can be practiced or carried out in various ways.

The benefits of the current method include a manner to make a chemical reactor with increased reactant surface areas as compared to other compact chemical reactors. The present method also provides a manner to make a compact chemical reactor to scale to micro-dimensions, so that very small compact chemical reactors can be created.

The method was designed to enable users to scale up a compact chemical reactor to larger sizes without the need for external components to hold the compact chemical reactor together.

According to the method, the compact chemical reactor is made up from an assembly of many unit reactors. Each unit reactor is made up of distinct layers. The method teaches the creation of a compact chemical reactor layer from multiple thin layered of functional and structural materials.

Figure 1:
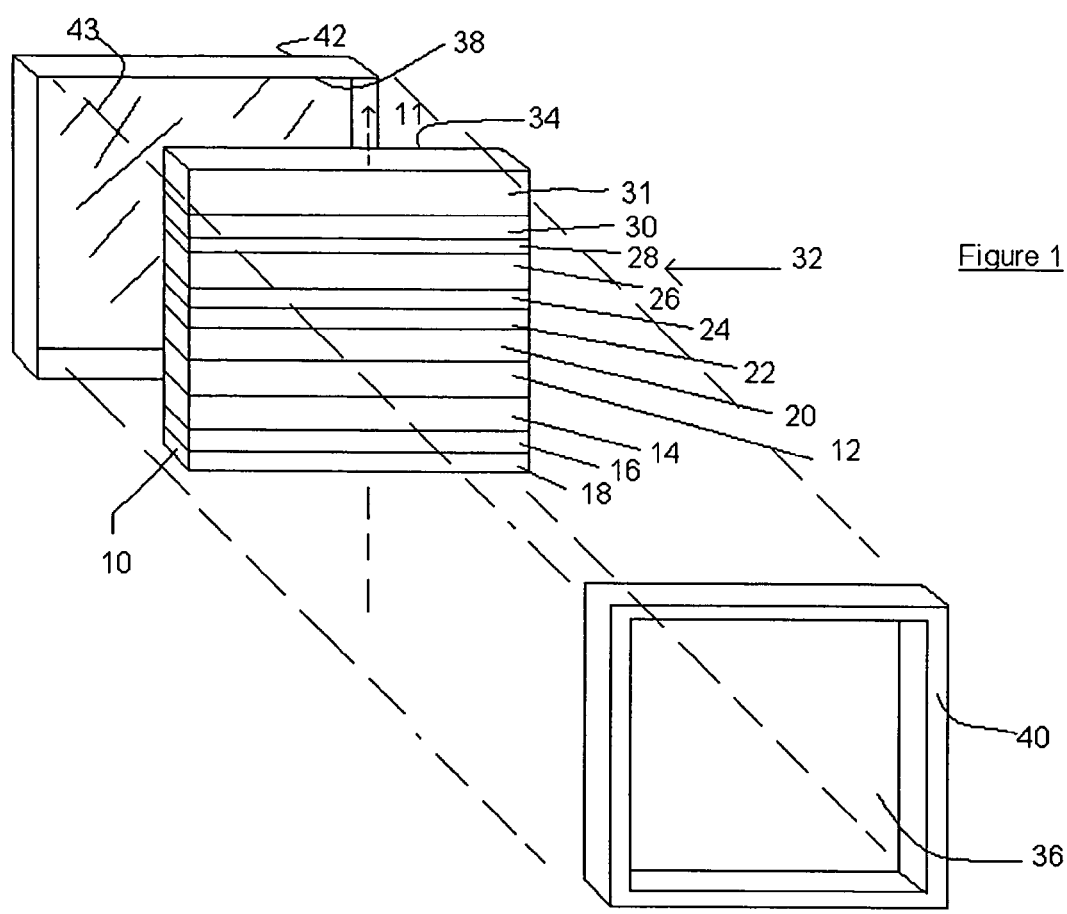
FIG. 1 depicts a front perspective view of a thin flat construction of the compact chemical reactor made according to the inventive method.

With reference to the figures, FIG. 1 is a front perspective view of a compact chemical reactor (10) made according to the method of the invention. FIG. 1 depicts a thin flat construction embodiment of the compact chemical reactor made by the method.

FIG. 1 shows a thin flat compact chemical reactor made by the method having an overall dimension which is between about 1 centimeter and 100 centimeters in length, between about 1 millimeter and about 80 centimeters in width, and between about 100 nanometers and about 5 centimeters in thickness.

Figure 2:
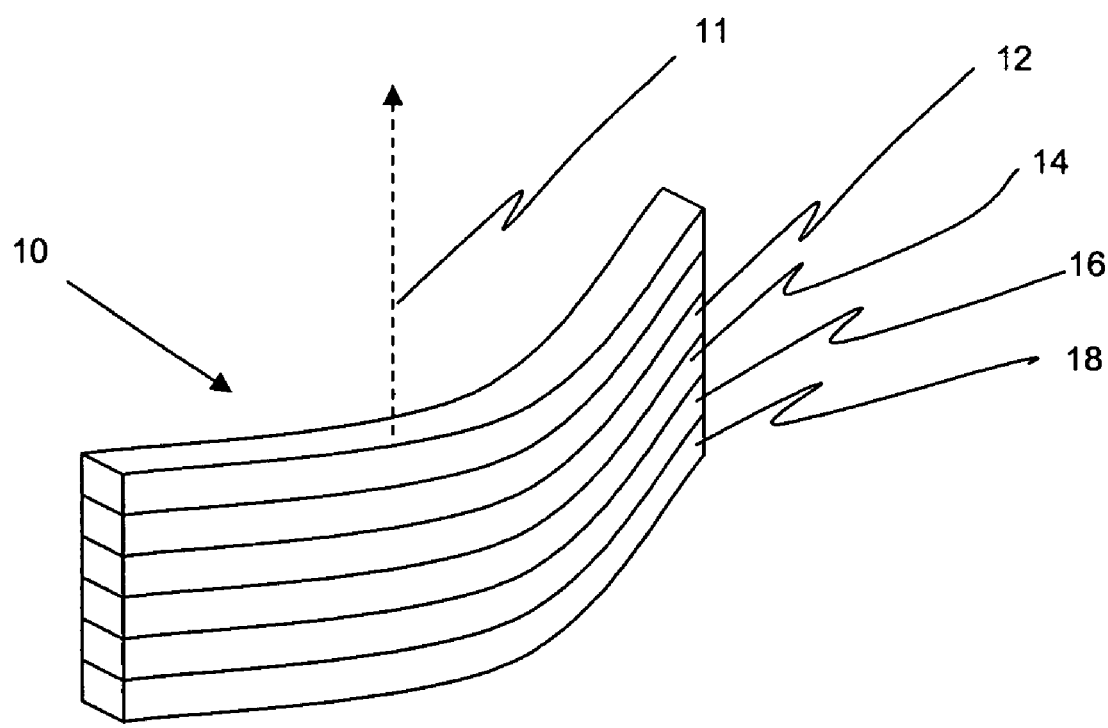
FIG. 2 depicts a front perspective view of a curvilinear construction of the compact chemical reactor made according to the inventive method.

FIG. 2 depicts a thin curvilinear embodiment of the compact chemical reactor (10) made by the method. The curvilinear version of the compact chemical reactor in the figure has an overall diameter between 1 centimeter and 5 centimeters and a height of between 5 millimeters and 80 millimeters. Other shapes besides a cylindrical shape can be used. As an alternative to the embodiments depicted in FIG. 1 and FIG. 2, the compact chemical reactor (10) can be made to have a shape like a rectangle, a square, a triangle, an octagon, a pentagon, another irregular shape, or another prismatic shape.

The compact reactor (10) can be made with a variable thickness. Variable thickness can mean that one individual unit reactor can be thicker than an adjacent unit reactor.

FIG. 1 in particular shows a compact chemical reactor with eleven unit reactors connected together. In particular, FIG. 1 depicts first unit reactor (12), a second unit reactor (14) and nine other unit reactors (16, 18, 20, 22, 24, 26, 28, 30, and 31).

The first and second unit reactors are disposed adjacent each other and form a front side (32) and a back side (34) for the compact chemical reactor. The front side (32) communicates with the front reactant plenum (36) and the back side (34) communicates with the back reactant plenum (38). In another version, the unit reactors can be oriented to form the back reactant plenum (38).

Returning to FIG. 1, the compact chemical reactor (10) made by the method includes a front reactant plenum (36) and a back reactant plenum (38). The front reactant plenum (36) is enclosed by a structure (40). The structure can either be a closed container or open to ambient atmosphere. FIG. 1 depicts an embodiment of the structure (40) open to ambient atmosphere. When the front reactant plenum is open to the atmosphere the enclosing structure (40) is optional. The structure (40), when open to the atmosphere, adds structural support to the front reactant plenum.

The back reactant plenum (38) is enclosed by a device (42) that is similar to structure (40). The device (42) can be a closed container or open to ambient atmosphere. When the device (42) is open to the atmosphere, the device (42) adds structural support to the back reactant plenum. FIG. 1 depicts an embodiment wherein the device (42) is a closed container with a solid back wall (43).

The compact chemical reactor is made to have high aspect ratio cavities from components with low aspect ratio cavities, using a defined series of steps:
a. forming at least two process layers;
b. forming a perimeter barrier on at least one side of one of the process layers creating an intermediate assembly with at least one low aspect ratio cavity;
c. repeating steps (a) to (b) to create additional intermediate assemblies with at least one low aspect ratio cavity;
d. joining intermediate assemblies to create a compact chemical reactor with high aspect ratio cavities; and
e. joining the compact chemical reactor with high aspect ratio cavities to two reactant plenums to facilitate a transport process between the reactant plenums and the process layers.

The compact chemical reactor (10) is constructed of at least four intermediate assemblies. The design of the compact chemical reactor (10) can range from 2 to 100,000 intermediate assemblies. Each intermediate assembly is ½ of a unit reactor (12, 14, 16, 18, 20, 22, 24, 26, 28, 30, and 31) as shown in FIG. 1. In a preferred embodiment, up to 1 unit reactor or more unit reactors can be used to make the compact chemical reactor. Between 2 unit reactors to 500 unit reactors are an exemplary range and 2 unit reactors to 100 unit reactors as an alternative range.

Figure 3:
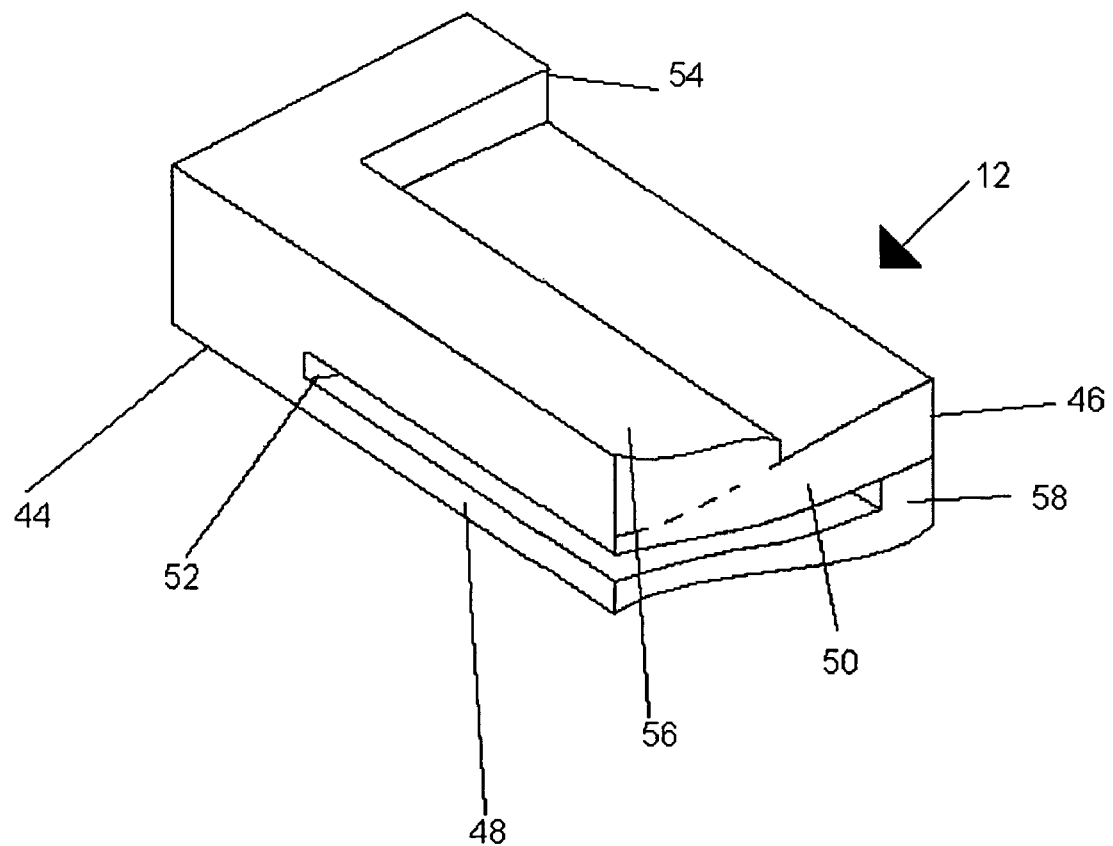
FIG. 3 is a cutaway perspective view of a unit reactor made from the intermediate assemblies used in the inventive method.

FIG. 3 depicts a cutaway perspective view of an individual unit reactor (12) made with a front cavity (52) and a back cavity (54). The cavities (52 and 54) are formed between the front and back process layers (48 and 50). Each individual unit reactor includes a front perimeter barrier (56) and a back perimeter barrier (58). The front perimeter barrier (56) is located on the back process layer (50) substantially surrounding the back cavity (54). The front perimeter barrier (56) can optionally completely enclose the back cavity (54). Likewise, the back perimeter barrier (58) is located on the front process layer (48) substantially surrounding the front cavity (52). The back perimeter barrier (58) can optionally completely enclose the front cavity (52).

The perimeter barriers ensure that reactant from one reactant plenum does not migrate into another reactant plenum, which connects to the other cavity. For example, when the compact chemical reactor functions as a fuel cell with oxidant in one of the reactant plenums and fuel in the other reactant plenum, the perimeter barriers prevent the uncontrolled mixing of fuel and oxidant.

The perimeter barriers keep the reactant from migrating by either the material type and/or the form of the perimeter barriers. Usable materials for the perimeter barriers include metal, such as stainless steel; silicone, such as RTV™ available from Dow Corning of Midland, Mich.; a rubber in the form of seals, such as those available from the Apple Rubber Products Incorporated of Lancaster, N.Y.; polyamide, such as nylon, such as a nylon, a nylon 6 or a nylon 6, 6 available from E.I. DuPont of Delaware; synthetic rubber, such as BUNA available from Dow Synthetic Rubber of Edegem Belgium; epoxy, such as those available from EPO Tech Billerica, Mass.; polytetrafluoroethylene, also available as Teflon™, from various sources; polyvinyldiflouride, known as Kynar™, available from Atofina Chemicals; and composites thereof, laminates thereof, alloys thereof, and blends of these materials.

Usable forms for the perimeter barriers include microstructures or three-dimensional structures that create a tortuous path for the reactant. In some cases, the perimeter barriers can employ both the use of materials and a structural form to prevent the migration of the reactant to another reactant plenum.

One or more of the substantially empty cavities can be filled partially or completely filled with a material to aid in the transport of reactant, byproduct of the reaction caused by the reactants, or transport of attributes of reactant. A porous media, such as those available from Angstrom Power Inc. of Vancouver, Canada can be used to partially or to completely fill the cavities. In a preferred embodiment, the cavity is filled 100% with the porous media although the cavity can be filled as little as 5% with the porous media.

Continuing with FIG. 3, the back perimeter barrier (58) forms an assemblage with a front face (44) and a back face (46). The front cavity (52) communicates with the front side (32) of the compact chemical reactor which was shown in FIG. 1. The back cavity (54) communicates with the back side (34) of the compact chemical reactor also shown in FIG. 1. One or more of the process layers facilitate the transport process between the reactant plenums.

The process layers (48 and 50) are shown as thin sheets with each process layer having, preferably, a thickness between 1 nanometer and 2 centimeters. As an alternative, the one or more process layers can have a thickness different from another process layer. It is contemplated that the method can produce process layers which may not be thin sheets. It is also contemplated that the thin sheets can be made from one of a variety of materials. For example, process layer material could be an electrolyte, an ion exchange membrane, a filtration membrane, a separation membrane, a micro-structured diffusion mixer, a heater, a catalyst, electrical conductors, thermal conductors, and combinations of these. For example, a workable ion exchange membrane would be Nafion™ available from E.I. DuPont DeNamours of Wilmington, Del. A usable separation membrane could be Nafion™ as well. A micro-structured diffusion mixer is available from Micronics of Seattle, Wash. and typically serves to allow transport of liquid from one cavity to another by diffusion without use of a separation membrane. A heater that would be usable in the method would be a thin film resistive heater, such as those available from Omega of Stamford, Conn. Catalysts that are contemplated as useable include inorganic carbon catalysts, such as Novacarb™ from Mast Carbon of the United Kingdom. An electrical conductor which is contemplated for use in the invention would be a thin film of metal, such as copper or a silver filled epoxy such as model number TF12202 from Tech Film of Peabody, Mass.

Thermal conductors usable in the invention can be metals, such as thermally conductive epoxy adhesive films such as those also available from Tech Film.

Alternatively, each process layer can be made of a filled metal composite, a filled microstructure of polymer, a filled porous polymer composite, filled epoxy composite, graphite composite, or combinations of these materials. Filled metal composites would be a stainless steel filled with carbon, such as those available from Angstrom Power Inc. of Vancouver, Canada. Filled microstructures of polymers include Primea™ membrane available from Gore Industries of Elkton, Md. Filled epoxy composites include those available from Tech Film of Peabody, Mass. Graphite composites include Grafoil™ available from Graftek of Wilmington, Del.

The compact chemical reactor can be made with a method whereby a first process layer performs a different process from the second process layer. For example, the first process layer can be an electrolyte and the second process layer can be an electrical conductor if the method is used to make a fuel cell or electrolyzer.

Examples of usable reactants include fuels, water, oxidants, beverages, liquid phase hydrocarbons, gas phase hydrocarbons, foodstuffs, by-products of the reaction and combinations of these materials. Fuels that could be used include hydrogen, hydrogen from reformate, ammonia, sodium borohydride or other chemical hydrides. Oxidants that could be used include oxygen, air, or means of generating oxygen such as hydrogen peroxide. Beverages that could be used as reactants include wine, juices, and other liquids with particulate. Liquid phase hydrocarbons which can serve as reactants include methanol, ethanol, butanol, and formic acid. Gas phase hydrocarbons include propane, butane, methane, and combinations of these materials. Foodstuffs include whey of cheese products, chocolates based liquids, and other foodstuffs which are initially liquid and then solidify.

The method forms a device that moves reactants and/or attributes of one of the reactants.

Attributes of reactants within the scope of this application include ionic charge (when used as a fuel cell) heat (when used as a heat exchanger), moisture content (when used as a humidifier), pressure (when used with a gas permeable membrane to allow gas to diffuse out of a liquid), concentration (when used to transport material from a substance having a first concentration to a substance with a different concentration), electrical charge, and other similar physical characteristics. For example, the chemical reactor can move large amounts of heat from a first reactant plenum to a second reactant plenum.

When the method is used to create a fuel cell, fuel is filled in one reactant plenum and oxidant in the other. The fuel and oxidant are able to be transported to be in contact with the process layers. The process layers have anodes and cathodes by filling the cavities with electrochemically active materials. Electricity is produced by the fuel cell reactant and is transported out of the fuel cell through conductive paths in the layer structure. Water and heat are produced as bi-products of the reaction. The water is transported out of the cavities back into the reactant plenum and heat dissipates through the physical structure.

When the method is used to create an electrolyzer, anodes and cathodes are formed on either side of some of the process layers by at least partially filling the cavities with electrochemically active materials. Water is used to fill reactant plenums and is transported into the electrolyzer to come into contact with the anodes and cathodes at the process layers. The electrolysis reaction uses electrical energy to decompose water into water's constituent elemental components, i.e. hydrogen and oxygen. The constituent elemental components are formed at the electrodes and then are transported back into the reactant plenums by convection The method can produce an exemplary compact chemical reactor with an overall length between 1 centimeter and 10 centimeters; an overall width of between 5 millimeters and 80 millimeters; and an overall thickness between the front face and the back face between 100 nanometers and 5 centimeters.

The compact chemical reactor assembled according to the present invention provides high surface area process layers which are in communication with the reactant plenums through the front or back cavities. The front or back cavities have high aspect ratios, wherein the distance from the front or back face to the opposite side of the cavity is much larger than the height of the front or back perimeter barrier.

Before assembly, the open cavities have low aspect ratios wherein the depth of the cavities is much less than the width or length of the cavities. The compact chemical reactor is uniquely formed to have high aspect ratio cavities when the intermediate assemblies are joined to form unit reactors.

The reactor preferably is made wherein the high aspect ratio of at least one cavity is greater than 1 cm/cm, more preferably the high aspect ratio is between 1 cm/cm and 100 cm/cm and most preferably the high aspect ratio is between 2.5 cm/cm and 15 cm/cm.

In operation, reactants move from the reactant plenums into the front or back cavities of the unit reactors to come into contact with the process layers. In a preferred embodiment, the reactants move in and out of the cavities through diffusion only. In an alternative embodiment the reactant transports into and out of the cavities is aided by forced convection or by the forced flow through a micro-structure embedded within at least on of the front or back cavities.

The method forms a high aspect ratio compact chemical reactor using low aspect ratio layers. The initial step entails creating two or more low aspect ratio process layers.

The low aspect ratio process layers can be created by depositing a precursor material on a substrate. The types of precursor materials usable with the method include an electrolyte, an ion exchange membrane, a proton exchange membrane, a filtration membrane, a separation membrane, a micro-structure diffusion mixer, a heater, a catalyst, an electrical conductor, a thermal conductor, a microstructure of polymers, a filled microstructure of a polymer, a filled epoxy composite, a filled graphite composite, a filled metal composite, a plastic, or other similar materials.

The substrate on which the precursor materials are deposited can be a release layer, such as a polyamide, like nylon, nylon 6 or nylon 6, 6, a polyethylene, or polytetrafluroethylene. The substrate can be one of the low aspect ratio process layers. The substrate can be another unit reactor, a portion of a unit reactor, such as a partially filled low aspect ratio cavity, or a fuel cell.

The low aspect process layer can be created by forming a material into a shape. The material is formed by ablating, etching, stamping, printing, milling, die cutting, molding, casting, or water jetting, depositing of a material on a substrate or forming the process layers from a desirable material. The material can be formed in numerous shapes including a rectangle, a square, a cylinder, a triangle, an octagon, a pentagon, irregular shapes, or other prismatic shapes.

The process layers are formed into thin sheets with each process layer having, preferably, a thickness between 1 nanometer and 2 centimeters. As an alternative, the one or more of the process layers can have a thickness different from an adjacent process layer. Different process layers can perform different processes. Each process layer can be made of a filled metal composite, a filled micro-structure of polymer, a filled epoxy composite, a graphite composite, or combinations thereof.

The method continues by creating a plurality of low aspect ratio perimeter barriers by forming a barrier material into a barrier shape. In an alternative method, the low aspect perimeter barriers are formed by depositing barrier materials on a substrate.

The barriers ensure that reactant from one reactant plenum does not migrate into another reactant plenum. Usable materials for the barriers include metals, silicone, rubbers, a polyamide, such as nylon, a synthetic rubber, an epoxy, polytetrafluoroethylene, polyvinyldiflouride, an ion exchange material, a proton exchange material, composites thereof, laminates thereof, alloys thereof, blends thereof, and other combinations thereof.

Usable shapes for the barriers include micro-structures or three-dimensional structures that create a tortuous path for the reactant. In some cases, the barriers can employ materials and a form which are both used to prevent the migration of the reactant to another reactant plenum Low aspect ratio cavities are created by joining a low aspect ratio perimeter barrier to at least one side of one of the process layers. The preferred low aspect ratio is a ratio of length to width greater than one. The step of joining the perimeter barrier to the process layer can be performed by welding, adhering, clamping, screwing, or otherwise engaging the perimeter barrier to the process layer.

The steps of creating the low aspect ratio cavities and high aspect ratio cavities are repeated until the desired number of layers is formed. The formed layers are then assembled to form a compact chemical reactor with high aspect ratios. The method contemplates that between 2 and 100,000 intermediate assemblies are joined to form the compact chemical reactor.

Figure 4:
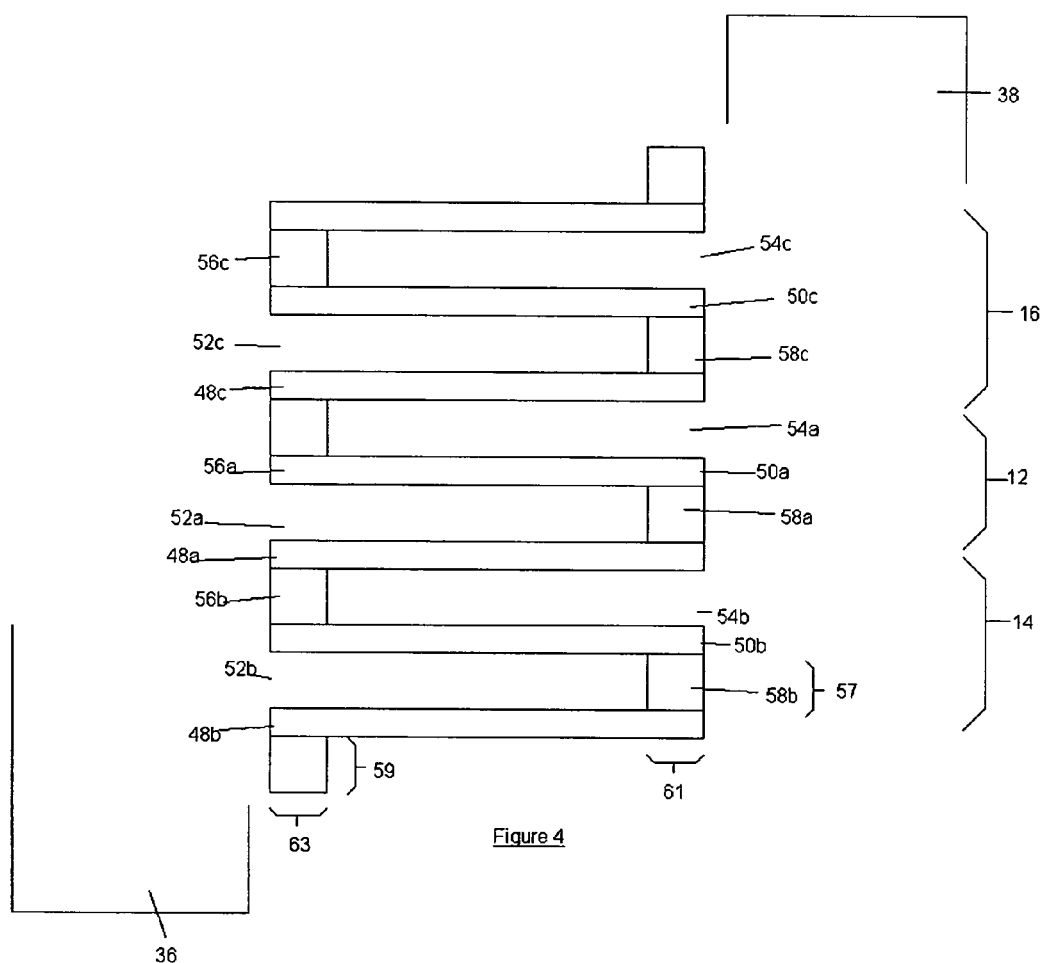
FIG. 4 depicts a cross-sectional schematic of a group of unit reactors stacked sequentially according to the method.

FIG. 4 shows a cross-sectional schematic of a group of unit reactors (12, 14, and 16) made according to this method. Each unit reactor has a front process layer (48a, 48b, and 48c) and a back process layer (50a, 50b, and 50c). The front cavity (52a, 52b, and 52c) is formed between the corresponding front and back process layers. Likewise, the back cavity (54a, 54b, and 54c) is formed by corresponding front and back process layers. FIG. 4 depicts the orientation of these parts when the unit reactors are stacked. The adjacent unit reactors connect adjacent front perimeter barriers and front process layers in this stacked embodiment.

FIG. 4 also shows the dimensions of height and width for the front perimeter barriers (56a, 56b, and 56c) and the back perimeter barriers (58a, 58b, and 58c) made on the process layers of the unit reactors according to the method of the invention. The front and back perimeter barrier height (57 and 59) respectively have a preferred dimension ranging from about 100 nanometers to about 10 millimeters. The front and back perimeter barrier width (61 and 63) respectively have a preferred dimension ranging from about 10 nanometers to about 5 millimeters. In still another embodiment, the front and back perimeter barrier widths can vary, being less on one portion of the perimeter barrier and greater on another portion of the perimeter barrier.

Figure 5:
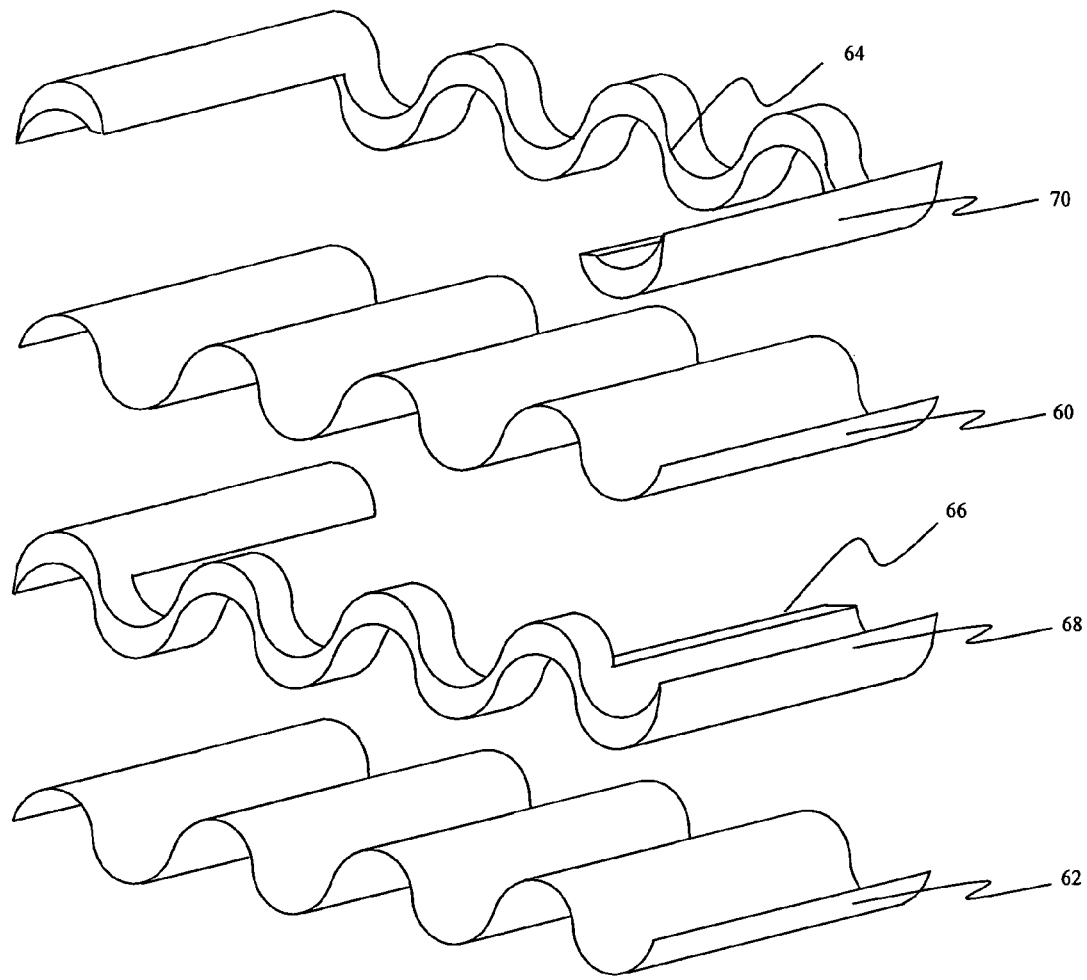
FIG. 5 depicts an exploded perspective view of an undulating unit reactor made by using the method.

FIG. 5 depicts an exploded perspective view of an undulating unit reactor made by the method of this invention. The process layers are undulating front and back process layers (60 and 62). The front cavity is an undulating front cavity (64) and the back cavity is an undulating back cavity (66). The front perimeter barrier is an undulating front perimeter barrier (68) and the back perimeter barrier is an undulating back perimeter barrier (70). Undulating in the context of this application refers to non-planar process layers, such as layers which are sinusoidal in shape, or arcs, or irregular in some other manner. Some of the process layers can be undulating while remaining process layers can be planar and still form a usable compact chemical reactor.

The compact chemical reactor can be a fuel cell layer formed from multiple unit reactors, each of which is a unit fuel cell. The method includes a method for making a fuel cell layer with high aspect ratio cavities from components with low aspect ratio cavities.

The method entails forming at least two process layers and forming a perimeter barrier on at least one side of one of the process layers creating an intermediate assembly with low aspect ratio cavities. The steps are repeated to create additional intermediate assemblies with at least one low aspect ratio cavity The method continues by joining intermediate assemblies to create a fuel cell layer with high aspect ratio cavities and, then, joining the fuel cell layer to an oxidant plenum comprising oxidant and a fuel plenum comprising fuel to facilitate a transport process between the fuel plenum, oxidant plenum and the process layers.

Figure 6:
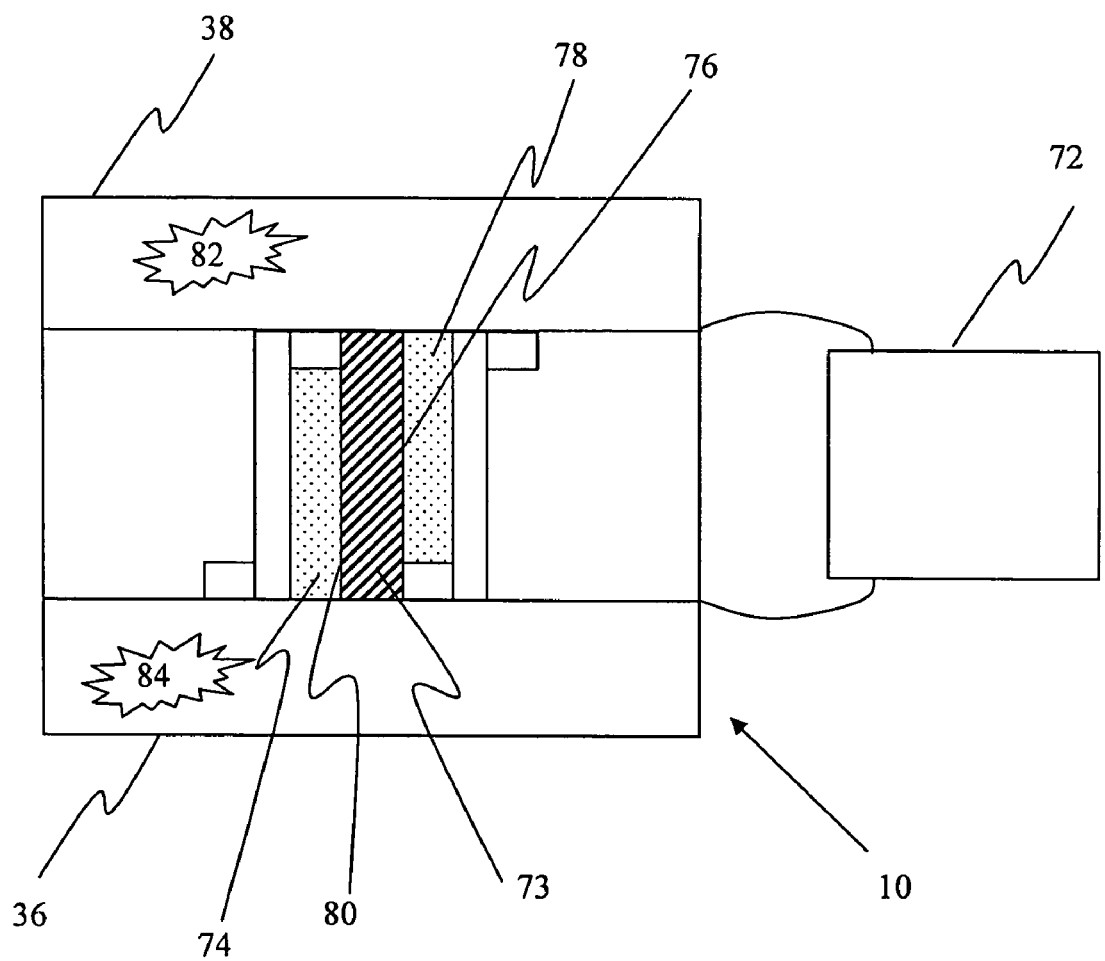
FIG. 6 depicts a cross sectional schematic of an appliance using the output of the compact chemical reactor.

FIG. 6 depicts an embodiment wherein the compact chemical reactor is a fuel cell layer and the fuel cell layer is used in conjunction with an electrical appliance (72).

The electrical appliance (72) uses the compact chemical reactor (10) as a source of electrical power, that is, as a fuel cell. The unit fuel cells each comprise one or more process layers of electrolyte (73). One or more of the cavities include a first catalyst (74) forming at least one anode (80). One or more other cavities include a second catalyst (78) forming at least one cathode (76). The anode (80) and the cathode (76) are disposed on either side of the electrolyte (73). One of the reactant plenums contains an oxidant (82), such as oxygen, and one reactant plenums contain a fuel (84), such as hydrogen. The anode (80) and the cathode (76) connect to the electrical appliance and provide power.

When the method is used to make the fuel cell layer, at least one process layer must be ionically conductive in order to facilitate the transport of ions. Optionally, at least one process layer may be electrically conductive to transport electrons between unit reactors. An ionically conductive process layer can be a proton exchange membrane, an electrolyte filled micro-porous structure, a liquid electrolyte trapped in a mesh and combinations thereof. An electronically conductive process layer can be made from an electrical conductor, a filled metal composite, a filled micro-structure of polymer a filled epoxy composite, a graphite composite, and combinations thereof.

The embodiments have been described in detail with particular reference to certain preferred embodiments thereof, but it will be understood that variations and modifications can be effected within the scope of the embodiments, especially to those skilled in the art.

What is claimed is:

1. A method for making a high aspect ratio compact chemical reactor with high aspect ratio cavities using components with low aspect ratio cavities, comprising the steps:
   a. creating at least two low aspect ratio process layers;
   b. forming at least one low aspect ratio perimeter barrier by forming a barrier material into at least one barrier shape;
   c. creating low aspect ratio cavities by joining the low aspect ratio perimeter barrier to at least one side of one of the low aspect ratio process layers creating an intermediate assembly with at least one low aspect ratio cavity;
   d. repeating steps (a) to (c) to create additional intermediate assemblies with at least one low aspect ratio cavity;
   e. creating high aspect ratio cavities by joining one of the low aspect ratio process layers to the low aspect ratio cavities;
   f. repeating steps (d) and (e) to create a plurality of joined intermediate assemblies to create a compact chemical reactor with high aspect ratio cavities; and
   g. joining the compact chemical reactor with high aspect ratio cavities to two reactant plenums to facilitate a transport process between the reactant plenums and the process layers.

2. The method of claim 1, wherein the step of forming the perimeter barrier comprises making a structural form that prevents reactant from one plenum from moving into the other plenum.

3. The method of claim 2, wherein the structural form can be a micro-structure or a three-dimensional structure with a tortuous path.

4. The method of claim 1, wherein a thin flat fuel cell layer is made.

5. The method of claim 1, wherein a thin curvilinear fuel cell layer is made.

6. The method of claim 1, wherein a volume enclosing fuel cell layer is made.

7. The method of claim 1, wherein the step of forming a perimeter barrier comprises depositing a barrier material on a portion of at least one of the process layers.

8. The method of claim 1, wherein the step of forming a perimeter barrier comprises forming a barrier from barrier material and then joining the formed barrier material to at least a portion of at least one of the process layers.

9. The method of claim 1, wherein the step of forming the process layers further comprises creating process layers with a defined shape selected from the group consisting of: a rectangle, a square, a triangle, an annular ring, an arc, an irregular shape, and other prismatic shapes.

10. The method of claim 1, wherein the step of forming the process layers is by depositing a precursor material on a substrate.

11. The method of claim 10, wherein the substrate comprises a release layer.

12. The method of claim 11, wherein the release layer comprises a polyamide, a polyethylene, or polytetrafluroethylene.

13. The method of claim 10, wherein the substrate is one of the low aspect ratio process layers.

14. The method of claim 10, wherein the substrate comprises a unit reactor.

15. The method of claim 10, wherein the substrate comprises a portion of a unit reactor.

16. The method of claim 10, wherein the substrate is an at least partially filled low aspect ratio cavity.

17. The method of claim 10, wherein the substrate is a fuel cell.

18. The method of claim 10, wherein the substrate is an electrolyzer.

19. The method of claim 1, further comprising the step of at least partially filling at least one of the plurality of low aspect ratio cavities with at least one material to facilitate the transport of reactant material.

20. The method of claim 19, wherein the material comprises a catalyst, a porous material, an electrical conductor, and combinations thereof.

21. The method of claim 19, wherein the step of at least partially filling the at least one low aspect ratio cavity comprises forming a micro-structure in the low aspect ratio cavity.

22. The method of claim 19, wherein the step of at least partially filling at least one of the low aspect ratio cavities comprises filling the cavity with a porous media and a catalyst layer.

23. The method of claim 1, wherein each process layer comprises an electrolyte, an ion exchange membrane, a proton exchange membrane, a filtration membrane, a separation membrane, a microstructure diffusion mixer, a heater, a catalyst, an electrical conductor, a thermal conductor, a microstructure of a polymer, a filled microstructure of a polymer, a filled epoxy composite, a filled graphite composite, a filled metal composite, a plastic, or combinations thereof.

24. An electrolyzer made by the method of claim 1.

25. The method of claim 1, wherein the step of forming the barrier material comprises ablating, etching, stamping, printing, milling, die cutting, molding, casting, water jetting, the barrier material or depositing of additional material on a substrate.

26. The method of claim 1, wherein each perimeter barrier comprises: a metal, a silicone, a rubber, a polyamide, a synthetic rubber, an epoxy, polytetrafluroethylene, polyvinyldiflouride, an ion exchange material, a proton exchange material, composites thereof, laminates thereof, an alloy thereof, and combinations thereof.

27. The method of claim 1, wherein high aspect ratio cavities is a ratio of the length to width which is less than 1 cm/cm.

28. The method of claim 1, wherein the step of creating intermediate assemblies comprises joining between 2 and 100,000 intermediate assemblies.

29. The method of claim 1, wherein the step of joining of the low aspect ratio perimeter barriers to the low aspect ratio process layers comprises using welding, adhering, clamping, screwing, or otherwise engaging the perimeter barriers to the process layers.

30. The method of claim 1, wherein the step of creating the low aspect process layer comprising forming an undulating high aspect ratio process layer.

31. A method for making a high aspect ratio fuel cell layer with high aspect ratio cavities from components with low aspect ratio cavities, comprising the steps:
   a. forming at least two low aspect ratio process layers;
   b. forming a perimeter barrier on at least one side of one of the low aspect ratio process layers creating an intermediate assembly with low aspect ratio cavities;
   c. repeating steps (a) to (b) to create additional intermediate assemblies with at least one low aspect ratio cavity;
   d. joining intermediate assemblies to create a fuel cell layer with high aspect ratio cavities; and
   e. joining the fuel cell layer with high aspect ratio cavities to an oxidant plenum comprising oxidant, and a fuel plenum comprising fuel, to facilitate a transport process between the fuel plenum, oxidant plenum and the process layers.

32. The method of claim 31, wherein the step of forming the perimeter barrier comprises making a structural form that prevents the mixing of fuel and oxidant.

33. The method of claim 32, wherein the structural form can be a microstructure or a three dimensional structure with a tortuous path.

34. The method of claim 31, wherein a thin flat fuel cell layer is made.

35. The method of claim 31, wherein a thin curvilinear fuel cell layer is made.

36. The method of claim 31, wherein a volume enclosing fuel cell layer is made.

37. The method of claim 31, wherein the step of forming a perimeter barrier comprises depositing a barrier material on a portion of at least one of the process layers.

38. The method of claim 31, wherein the step of forming a perimeter barrier comprises forming a barrier from barrier material and then joining the formed barrier material to at least a portion of at least one of the process layers.

39. The method of claim 38, wherein the step of joining the perimeter barrier to the low aspect ratio process layer comprises using: welding, adhering, clamping, screwing, or otherwise engaging the perimeter barrier to the process layer.

40. The method of claim 31, wherein the step of forming the process layers further comprises creating process layers with a defined shape selected from the group consisting of: a rectangle, a square, a triangle, an annular ring, an arc, and an arbitrary pattern.

41. The method of claim 31, wherein the step of creating the process layers is by depositing a precursor material on a substrate.

42. The method of claim 41, wherein the substrate comprises a release layer.

43. The method of claim 42, wherein the release layer comprises a polyamide, a polyethylene, or polytetrafluroethylene.

44. The method of claim 41, wherein the substrate comprises a fuel cell.

45. The method of claim 41, wherein the substrate comprises a portion of a fuel cell.

46. The method of claim 45, wherein the substrate is an at least partially filled low aspect ratio cavity.

47. The method of claim 31, further comprising the step of at least partially filling at least two of the low aspect ratio cavities with material to create at least two gas diffusion electrodes, wherein said material comprises: a catalyst, a porous material, an electrical conductor, a hydrophobic polymeric binder, or a combination thereof.

48. The method of claim 47, further comprising the step of connecting at least one of the gas diffusion electrodes to the fuel plenum and at least one of the gas diffusion electrodes to the oxidant plenum.

49. The method of claim 31, wherein the step of at least partially filling the at least one low aspect ratio cavity comprises forming a micro-structured gas diffusion electrode in at least one low aspect ratio cavity.

50. The method of claim 31, wherein each process layer comprises an electrolyte, an ion exchange membrane, a proton exchange membrane, electrical conductors, a microstructure of a polymer, a filled microstructure of a polymer, a filled epoxy composite, a filled graphite composite, a filled metal composite, a plastic, or combination thereof.

51. The method of claim 31, wherein the step of forming the perimeter barrier comprises a member of the group: ablating, etching, stamping, printing, milling, die cutting, molding, casting, water jetting, the barrier material or depositing of material on a substrate.

52. The method of claim 31, wherein each perimeter barrier comprises: a metal, a silicone, a rubber, a polyamide, a synthetic rubber, an epoxy, polytetrafluroethylene, polyvinyldiflouride, an ion exchange material, a proton exchange material, a composite thereof, a laminate thereof, an alloys thereof, and combinations thereof.

53. The method of claim 31, wherein the high aspect ratio of the high aspect ratio cavity is a ratio of the length to the width which is greater than 1 cm/cm.

54. The method of claim 31, wherein the low aspect ratio of the cavity is less than 1 cm/cm.

55. The method of claim 31, wherein the step of forming intermediate assemblies comprises joining between 2 and 100,000 intermediate assemblies to form the fuel cell layer.

56. The method of claim 31, wherein the step of forming the process layer comprising forming an undulating low aspect ratio process layer.

57. A fuel cell made by the method of claim 31.

58. A method for making of a high aspect ratio compact chemical reactor using low aspect ratio layers comprising the steps:
   a. creating a plurality of low aspect ratio process layers by depositing precursor materials on a substrate and forming a precursor material into a shape;
   b. creating a plurality of low aspect ratio perimeter barriers by depositing a barrier precursor material on a substrate and forming the barrier precursor material into a shape;
   c. creating low aspect ratio cavities by joining the low aspect ratio perimeter barrier to at least one side of one of the low aspect ratio process layers;
   d. creating high aspect ratio cavities by joining one of the low aspect ratio process layers to the low aspect ratio cavities;
   e. repeating steps (c) and (d) to create a plurality of formed layers; and
   f. assembling the plurality of formed layers to form a compact chemical reactor with high aspect ratios.

59. The method of claim 58, further comprising the step of at least partially filling the plurality of low aspect ratio cavities with active materials to facilitate the transport of reactant material or attributes, wherein at least partially filling the plurality of low aspect ratio cavities with active materials forms a partial reactor.

60. The method of claim 58, wherein the step of at least partially filling the plurality of low aspect ratio cavities comprises forming a micro-structure in the low aspect ratio cavities.

61. The method of claim 60, wherein the substrate is a release layer.

62. The method of claim 61, wherein the release layer is a polyamide, polyethylene, or polytetrafluroethylene.

63. The method of claim 58, wherein the step of at least partially filling the plurality of low aspect ratio cavities comprises filling with a porous media and a catalyst layer.

64. The method of claim 58, wherein the precursor material is a proton exchange membrane, filtration membrane, microstructure diffusion mixer, heater, catalyst, thermal conductors, microstructure of a polymer, filled epoxy composites, filled graphite composites, filled metal composites, or plastics.

65. The method of claim 58, wherein the substrate is one of the low aspect ratio process layers.

66. The method of claim 58, wherein the substrate is a unit reactor.

67. The method of claim 58, wherein the substrate is a portion of a unit reactor.

68. The method of claim 58, wherein the substrate is a fuel cell.

69. The method of claim 58, wherein the step of forming of the precursor material and the barrier precursor material into a shape is performed by ablating, etching, stamping, printing, milling, die cutting, molding, casting, or water jetting.

70. The method of claim 58, wherein the barrier precursor material comprises a metal, a silicone, a rubber, a nylon, a synthetic rubber, an epoxy, polytetrafluroethylene, polyvinyldiflouride, an ion exchange material, a proton exchange material, a composite thereof, a laminate thereof, an alloy thereof, or combinations thereof.

71. The method of claim 58, wherein the high aspect ratio of the high aspect ratio cavity is a ratio of the length to the width which is greater than 1 cm/cm.

72. The method of claim 58, wherein the low aspect ratio is when the ratio of length to width is <1.

73. The method of claim 58, wherein between 2 layers and 100,000 layers intermediate assemblies are joined to form the compact chemical reactor.

74. The method of claim 58, wherein the step of joining of the perimeter barrier to the low aspect process layer is performed by welding, adhering, clamping, screwing, or otherwise engaging the perimeter barrier to the process layer.

* * * * *

UNITED STATES PATENT AND TRADEMARK OFFICE
CERTIFICATE OF CORRECTION

PATENT NO.       : 7,458,997 B2                                          Page 1 of 2
APPLICATION NO.  : 10/818826
DATED            : December 2, 2008
INVENTOR(S)      : McLean et al.

It is certified that error appears in the above-identified patent and that said Letters Patent is hereby corrected as shown below:

In column 4, line 26, delete "polyvinyldiflouride," and insert -- polyvinyldifluoride, --, therefor.

In column 6, line 15, after "convection" insert -- . --.

In column 6, lines 61-62, delete "polytetrafluroethylene." and insert -- polytetrafluoroethylene. --, therefor.

In column 7, lines 24-25, delete "polytetrafluroethylene," and insert -- polytetrafluoroethylene, --, therefor.

In column 7, line 25, delete "polyvinyldiflouride," and insert -- polyvinyldifluoride, --, therefor.

In column 7, line 33, after "plenum" insert -- . --.

In column 8, line 28, after "cavity" insert -- . --.

In column 9, lines 56-57, in Claim 12, delete "polytetrafluroethylene." and insert -- polytetrafluoroethylene. --, therefor.

In column 10, line 34, in Claim 26, delete "polytetrafluroethylene," and insert -- polytetrafluoroethylene, --, therefor.

In column 10, lines 35-36, in Claim 26, delete "polyvinyldiflouride," and insert -- polyvinyldifluoride, --, therefor.

In column 10, line 38, in Claim 27, delete "wherein High" and insert -- wherein the high --, therefor.

In column 11, line 5, in Claim 33, delete "three dimensional" and insert -- three-dimensional --, therefor.

In column 11, lines 35-36, in Claim 43, delete "polytetrafluroethylene." and insert -- polytetrafluoroethylene. --, therefor.

In column 11, line 48, in Claim 47, delete "combination" and insert -- combinations --, therefor.

UNITED STATES PATENT AND TRADEMARK OFFICE
CERTIFICATE OF CORRECTION

PATENT NO. : 7,458,997 B2
APPLICATION NO. : 10/818826
DATED : December 2, 2008
INVENTOR(S) : McLean et al.

It is certified that error appears in the above-identified patent and that said Letters Patent is hereby corrected as shown below:

In column 11, line 62, in Claim 50, delete "combination" and insert -- combinations --, therefor.

In column 12, line 3, in Claim 52, delete "polytetrafluroethylene," and insert -- polytetrafluoroethylene, --, therefor.

In column 12, lines 3-4, in Claim 52, delete "polyvinyldiflouride," and insert -- polyvinyldifluoride, --, therefor.

In column 12, line 16, in Claim 56, delete "comprising" and insert -- comprises --, therefor.

In column 12, line 52, in Claim 62, delete "polytetrafluroethylene." and insert -- polytetrafluoroethylene. --, therefor.

In column 13, line 10, in Claim 70, delete "polytetrafluroethylene," and insert -- polytetrafluoroethylene, --, therefor.

In column 13, lines 10-11, in Claim 70, delete "polyvinyldiflouride," and insert -- polyvinyldifluoride, --, therefor.

Signed and Sealed this

Third Day of March, 2009

JOHN DOLL
*Acting Director of the United States Patent and Trademark Office*